United States Patent [19]
Ward

[11] Patent Number: 4,646,631
[45] Date of Patent: Mar. 3, 1987

[54] SYSTEM FOR PREPARING VEGETABLE OIL SEED MEAL FOR SOLVENT EXTRACTION

[75] Inventor: Joseph A. Ward, N. Humberside, England

[73] Assignee: Simon-Rosedowns Limited, Hull, England

[21] Appl. No.: 738,374

[22] Filed: May 28, 1985

[30] Foreign Application Priority Data

May 31, 1984 [GB] United Kingdom ............... 8413837

[51] Int. Cl.⁴ .............................................. A23N 1/00
[52] U.S. Cl. ........................................ 99/483; 99/495;
99/510; 99/536; 100/117; 100/145
[58] Field of Search ................ 99/516, 534, 495, 536,
99/509–513, 483, 467; 100/117, 145, 148;
366/318

[56] References Cited

U.S. PATENT DOCUMENTS 2,631,099 3/1953 Bonotto ........................... 99/495 X
4,099,455 7/1978 Wenger et al. .................. 99/483 X
4,361,081 11/1982 Howard ......................... 100/117 X Primary Examiner—Timothy F. Simone
Attorney, Agent, or Firm—Nies, Webner, Kurz & Bergert

[57] ABSTRACT

A process and system for preparing vegetable oilseed meal for subsequent solvent extraction of the contained vegetable oil, comprising a screwpress section and extruding/expanding section, a common worm shaft (10, 11) rotating within a perforated barrel wall section (14) and a non-perforate barrel wall section (18) connected by an annular member (16) with water injection nozzles (17) therein. Meal enters at inlet (13); oil is extracted through wall (14); the meal enters section (18) at increased temperature and moisture content; its temperature is then increased further to a level at which the increased moisture content will flash off as the meal leaves the restricted orifice (19) thus increasing the porosity and extractability of the meal.

6 Claims, 1 Drawing Figure

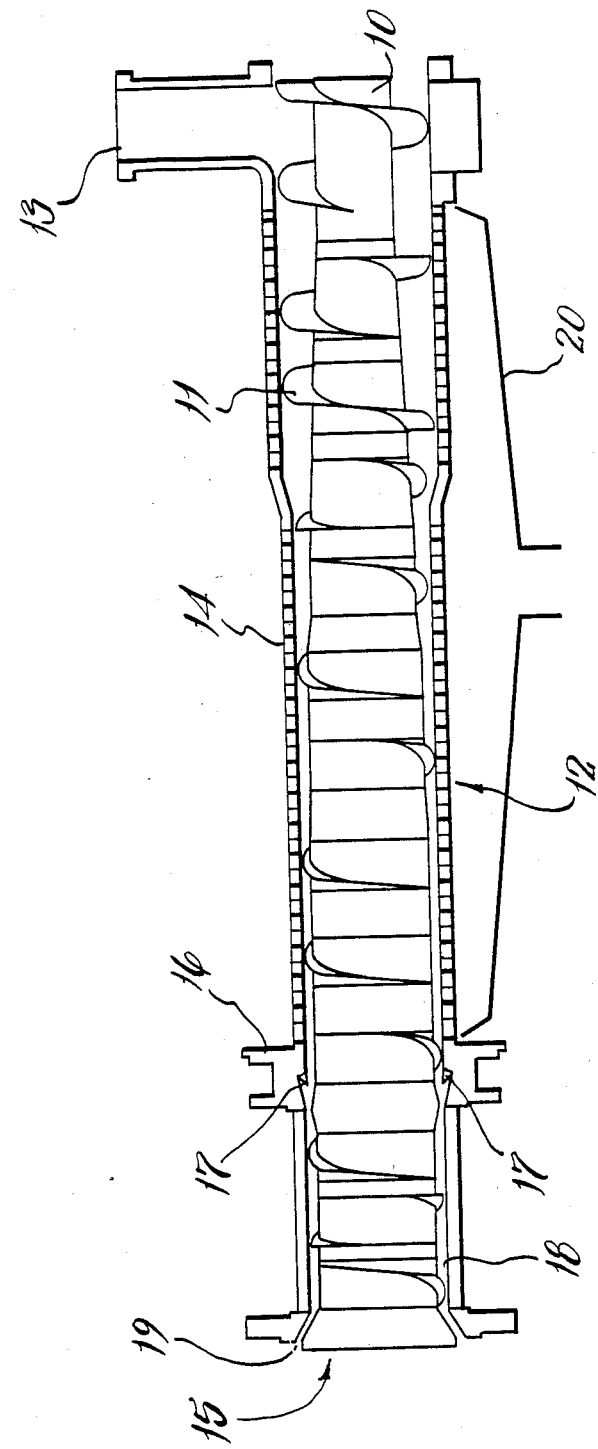

SYSTEM FOR PREPARING VEGETABLE OIL SEED MEAL FOR SOLVENT EXTRACTION

BACKGROUND AND SUMMARY OF THE INVENTION

This invention concerns a process and apparatus for preparing vegetable oilseed meal for subsequent solvent extraction of the contained vegetable oil. In processing vegetable oilseed on an industrial scale to produce vegetable oil and de-oiled meal, the usual final step is to extract oil from a prepared meal using a solvent such as hexane.

Some seeds, notably soya beans and palm kernels can be directly extracted after suitable pre-treatment by breaking, heating and rolling. However, many seeds are pressed prior to solvent extraction to remove the easily-won oil so that a "cake" of lower oil content, which is more readily extractable, is presented to the solvent extraction system. Seeds processed in this way include, for example, rapeseed, sunflower, groundnuts, cottonseed, and copra. The pressed meal, known as presscake is fed to the extractor with a residual oil content in the range 16% to 20%. The presscake is prepared by passing the vegetable oilseed through a machine in which it is advanced through a perforated barrel by a screw assembly so that its temperature is elevated slightly, and oil squeezed from the meal passes through the perforated barrel for collection.

The subsequent solvent extraction process is designed to produce a minimum oil content in the meal which is generally in the range 0.5 to 1.5%, and a minimum retention of solvent which is generally in the range 200–1000 ppm. The oil-in-meal percentage and the solvent retention are measures of the "extractability" of the material fed to the extraction process.

The present invention is based upon an appreciation that the extractability of many oilseeds can be improved by passing the pressed meal through an expander/extruder prior to solvent extraction.

An expander/extruder is a machine similar to a screwpress, but without a perforated barrel. The moisture level of the meal is increased with respect to that at which it normally leaves the barrel of a screw press, and the material is compressed and heated by the action of a worm assembly before it is extruded through one or more dies. The moisture in the material remains liquid within the barrel due to the high pressure generated therein, but as it emerges through the die, the moisture immediately flashes off, provided the temperature of the material is above 100° C. The sudden expansion and evacuation of moisture causes the material to become porous, which significantly enhances the subsequent rate of extraction by solvent, and the ease with which the solvent can be removed from the material after the extraction process.

An object of the present invention is to provide a process and system for preparing vegetable oilseed meal for subsequent solvent extraction, wherein the extractability of the material is increased with minimal energy requirement.

According to the present invention there is provided a process for preparing vegetable oilseed meal for subsequent solvent extraction of the contained vegetable oil, comprising the steps of introducing the meal into the inlet end of a machine having a screwpress section and an expander section, and in which it is advanced and worked by a worm and worm shaft rotating within a perforated barrel wall in the screwpress section and in a non-perforate barrel wall in the expander section, the meal passing from the screw press section directly into the expander section, increasing the moisture content of the meal passing into the expander section, and extruding the meal from the expander section through a restricted orifice.

Further according to the invention there is provided a system for preparing vegetable oilseed meal for subsequent solvent extraction of the contained vegetable oil, comprising a screwpress section and an expander section, a common worm shaft rotating within a barrel throughout said two sections and having a worm assembly thereon to advance and work meal fed to an inlet end of the screwpress section, a restricted orifice at an outlet end of the expander section, said barrel wall being perforated in the screwpress section for drainage of oil expressed from the meal, and being non-perforate in the expander section, there being means for increasing the moisture content of the meal passing from the screwpress section to the expander section.

BRIEF DESCRIPTION OF THE DRAWING

An embodiment of the invention will now be described, by way of example only, with reference to the accompanying drawing which illustrates schematically a combined screwpress and expander apparatus.

DESCRIPTION OF THE PREFERRED EMBODIMENTS

The apparatus comprises a worm shaft 10 carrying a helical array of worm segments 11 generally throughout its length. The worm shaft 10 is rotated in a barrel generally indicated at 12 and which has an inlet 13 for meal to be pressed and extruded. The barrel 12 consists of a perforated barrel section 14 which extends throughout approximately three quarters of its length from the meal inlet 13 and a non-perforated section 18 aligned with section 14 and extending to the far end 15 of the machine at which the material is extruded.

Means 20 are provided for collection of oil expressed through the perforated section 14. Between sections 14 and 18 is an annular member 16 in which there are provided water injection nozzles 17. The barrel section 18 terminates in an annular orifice 19 forming a die for extrusion of the material from within the barrel. Means, not shown, may be provided to cut the material into pellets as it leaves the die.

In use, vegetable oilseed meal is fed into inlet 13 at a rate of approximately 5 to 10 tons per hour. At the point of entry its temperature is in the range 80 to 85° C., its moisture content is in the range 4½% to 6%, and the oil content is between 40 and 55%. As the worm shaft 10 rotates, the meal is advanced along barrel section 14 and is worked by the worm segments 11 to cause oil to be expressed through the perforated barrel wall such that the meal arrives at the output end of section 14, i.e. adjacent member 16, with its temperature raised to between 90° and 100° C., its oil content reduced to between 16 and 20%, and with the moisture level approximately the same as at the point of entry. The moisture tends to remain with the meal rather than being expressed with the oil through the perforated barrel wall.

Water is injected into the meal through nozzles 17 at a pressure of between 100 and 150 bar thus to increase its moisture content to between 6½% and 8%. Subsequently, the meal is compressed in non-perforated barrel section 18 and extruded through die orifice 19 at which point its temperature has been raised to between 105° C. and 110° C., whereupon the added moisture from nozzles 17 undergoes sudden and rapid expansion as it leaves the die, the moisture therefore flashing off and reducing the moisture content of the meal once more to approximately 4½% to 6%. As the moisture flashes off there is an expansion of the meal which increases its porosity, and enhances its extractability.

It will be appreciated that by placing the extruder section with its non-perforated wall 18 directly on the output end of the screw press section of the machine, and permitting the material to pass directly from one to the other, there is no consequential loss of heat energy and compression energy at the interface between the two sections, and the additional moisture can be added conveniently at this position. In effect, the pressing and expanding processes are combined using a common worm shaft disposed within a generally common barrel.

The member 16 in which are disposed the water injection nozzles 17, can also enable injection of other ingredients such as might further enhance the extractability of the material or provide other characteristics therein, the extruder/expander section of the machine serving to ensure a complete mixing of the ingredients prior to solvent extraction.

Experiments have shown that the extractability of press cake extruded from a machine made in accordance with the invention, in the form of pellets is greatly increased, and the time subsequently taken to reduce the oil content by solvent extraction is reduced by 50%. Alternatively stated, for the same solvent extraction process time the residual oil can be reduced by approximately 30%. Additionally, meal extruded by this system has been found to be much more readily desolventised after extraction.

What is claimed is:

1. A system for preparing vegetable oil seed meal for subsequent solvent extraction of the contained vegetable oil, comprising a screw press section having an inlet end and an expander section having an outlet end, a barrel formed with a barrel wall, said barrel extending between said inlet and outlet ends and containing a common rotating wormshaft extending throughout said two sections, a worm assembly on said wormshaft to advance and work meal passed through the barrel from the inlet end to the outlet end, the meal passing directly from the screw press section to the expander section, and a restricted orifice at the outlet end of the expander section, said barrel wall being perforated in the screw press section for drainage of oil expressed from the meal, and being non-perforate in the expander section, and with means for increasing the moisture content of the meal passing from the screw press section to the expander section.

2. A system according to claim 1, wherein said worm assembly comprises a helical array of worm segments extending generally throughout the length of the worm shaft.

3. A system according to claim 1, wherein said means for increasing the moisture content of the meal comprises at least one water injection nozzle disposed in the wall of the barrel between the screwpress section and the expander section, and adapted to inject water into the meal at a pressure of between 100 and 150 bar.

4. A system according to claim 1, including means to collect oil issuing from the screwpress section through the perforated barrel wall, and means for cutting the meal issuing from the restricted orifice, into pellets.

5. A system according to claim 1, wherein the perforated wall section of the barrel extends throughout approximately three quarters of its overall length from the meal inlet end.

6. A system according to claim 1, wherein an annular member containing at least one injection nozzle serves to join together the perforated and non-perforate sections of the barrel wall such that the material passes directly from one section to the other with no consequential loss of heat energy and compression energy at the interface between the two sections.

* * * * *